United States Patent [19]

Liebert

[11] 4,184,332

[45] Jan. 22, 1980

[54] HYDROSTATIC TWO-CIRCUIT STEERING ARRANGEMENT

[75] Inventor: Karl-Heinz Liebert, Schwäb. Gmünd, Fed. Rep. of Germany

[73] Assignee: Zahnradfabrik Friedrichshafen AG, Friedrichshafen, Fed. Rep. of Germany

[21] Appl. No.: 923,679

[22] Filed: Jul. 11, 1978

[30] Foreign Application Priority Data

Jul. 22, 1977 [DE] Fed. Rep. of Germany ....... 2733128

[51] Int. Cl.² .................... F15B 11/16; F15B 13/09
[52] U.S. Cl. ....................... 60/386; 60/403; 60/486; 180/133
[58] Field of Search ............... 60/384, 385, 386, 400, 60/403, 486; 180/133

[56] References Cited

U.S. PATENT DOCUMENTS

| | | | |
|---|---|---|---|
| 3,730,288 | 5/1973 | Dean | 180/133 |
| 3,938,331 | 2/1976 | Polacek et al. | 60/386 X |

Primary Examiner—Edgar W. Geoghegan
Attorney, Agent, or Firm—Zalkind & Shuster

[57] ABSTRACT

A differential drive arrangement interconnects positive displacement pumps with a manual actuating mechanism of an auxiliary fluid power steering system for vehicles to compensate for variations in fluid outflow from the pumps pressurizing two servomotors through two fluid operating circuits. Check valves in the two fluid circuits are arranged to maintain operation of only an appropriate one of the differentially driven pumps through one of the two fluid circuits when a pressure loss occurs in the other of the fluid circuits.

4 Claims, 5 Drawing Figures

HYDROSTATIC TWO-CIRCUIT STEERING ARRANGEMENT

Cross reference is made to the following patent applications:

Ser. No. 918,422, filed by ERICH JABLONSKY on June 23, 1978, for: AUXILIARY POWER STEERING FOR MOTOR VEHICLES:

Ser. No. 923,682, filed by ERICH JABLONSKY on July 11, 1978, for: AUXILIARY POWER STEERING FOR MOTOR VEHICLES;

Ser. No. 935,947 filed by WERNER TISCHER on Aug. 23, 1978, for: TWO CIRCUIT STEERING ARRANGEMENT FOR MOTOR VEHICLES.

The preceding applications are all assigned to the Assignee of this application.

BACKGROUND OF THE INVENTION

This invention relates to a hydrostatic two-circuit steering system for an automotive vehicle or the like of the type in which the steerability of the vehicle is maintained by one circuit in the event failure of the other circuit occurs.

In such steering systems, the hand operated and metering pumps act as manually driven pumps in the absence of auxiliary fluid power. When auxiliary power is available, such pumps act as metering pumps to control the supply of pressure fluid to the servomotors in accordance with the displacement of the manual operating mechanism. In such prior known steering systems of the two-circuit type, rotary pump gear elements of reversible flow, positive displacement pumps serve as the hand operated and metering pumps. When the control valves of the system are shifted by the operating mechanism, the outlet sides of the pump elements are always connected to one pressure chamber of one of the two servomotors which are mechanically coupled to each other. A high operating pressure from a pressure source acts on the inlet sides of the two pump elements while the pressure vented chambers of both servomotors are connected to a fluid discharge line. Thus, in all operative positions of the control valves, separate hydraulic circuits are established each of which include one pump element and one pressure chamber associated with one of the two servomotors. In the neutral or center position of the control valves, both pressure chambers of both servomotors as well as the connections to both pump elements are blocked. However, the two hydraulic circuits are not completely separated. Therefore, as a result of a break in a critical line connection to a servomotor, the steerability of the vehicle is maintained for only a limited period of time, or until the operating fluid is drained at the break location.

Although duplication of prior known steering systems has been suggested including use of separate pumps and separate fluid reservoir tanks, the mere establishment thereby of two separate circuits creates problems in view of the coupling of the pumps with a common operating mechanism for drive in synchronism with each other. As a result of production tolerance variations, the volumetric outputs of the pumps deviate from each other. Further, the volumetric flow to and from the two servomotors differs from each other because of non-uniform piston surfaces to disturb the symmetrical relationship between the servomotors from an operational standpoint. Consequently, there is an operational phase differential created as a result of which hydraulic and mechanical interference between both circuits occurs.

It is therefore an important objective of the present invention to provide a hydrostatic steering apparatus for vehicles having two completely separate hydraulic circuits each of which include a pressure source and a servomotor with facilities to avoid functional hydraulic interference between the two circuits.

SUMMARY OF THE INVENTION

In accordance with the present invention, a fluid steering system for vehicles is provided having two pressure sources, two servomotors acting on steered parts of the vehicle, hand operated and metering pumps driven by one operating mechanism and two pressure operated control valves biased to a neutral position through which the servomotors are connected to one of the pressure sources and wherein a differential drive arrangement connects the manual operating mechanism to the pumps. The pumps are connected to the control valves by conduits having check valves therein that are operative in response to a loss of pressure in one of the conduits to maintain operation of the pump associated with the other of the conduits. Sufficient pressure is thereby generated to actuate one of the control valves against the bias of its return spring so that the steering operation may continue.

A variation in driving speed between the pumps is effected by the differential drive arrangement in order to compensate for any difference between the volumetric outflow of the two pumps and the differences in volumetric displacement by the pistons of the two servomotors. Hydraulic interference between the two fluid circuits is thereby reliably prevented. The differential drive arrangement is such that no additional facilities are required to cope with a loss of pressure in one circuit as a result of a break in a fluid line, for example. In such event, the pump associated with the intact circuit is no longer impelled and is not then effective to apply valve actuating pressure to the associated control valve for changing its position against the bias of the return spring. Since no functional valve shift occurs, the malfunctioning circuit does not become active. Through auxiliary means, drive of the pump associated therewith the intact surface is however maintained.

In accordance with one embodiment of the invention, a differential gear type of drive may be inserted between the manual operating mechanism and two separate pumps in order to achieve the desired effect. In another embodiment of the invention, the differential drive means is established by a driving connection between the inner gears of positive displacement pumps for universal movement relative to each other while one of the outer gears of the two pumps is connected to the manual operating mechanism while the other outer gear is fixedly attached to the frame of the vehicle. Since the two pumps form part of the differential gear arrangement, a less costly apparatus is realized.

Another feature of the present invention resides in the formation of the two control valves respectively associated with the two fluid circuits from a single shaft extending between the two pumps and having spaced axial bores therein within which drive shafts are disposed to which the inner pump gears are torsionally and swivelably connected. A further constructional simplification for the pumps and differential gear arrangement is thereby realized.

The aforementioned facilities for maintaining drive of the differentially driven pumps to actuate the control valve even though there is a loss of pressure in one of the fluid circuits, could be a slipping cluth to accommodate slippage between the two pumps. According to another embodiment of the invention, the foregoing pressure loss compensating function is achieved by hydraulic means in an energy conserving manner by use of special check valves at the control outlets of the pumps. Whenever the pressure in one fluid circuit drops because of a break in a line, fluid cannot drain from the control outlet of the associated pump before the other pump has generated the pressure necessary to shift its control valve from the central flow blocking position. The system will therefore remain functional as long as one fluid circuit is intact despite the presence of the differential drive arrangement aforementioned.

BRIEF DESCRIPTION OF THE DRAWING FIGURES

DETAILED DESCRIPTION OF PREFERRED EMBODIMENTS

Figure 1:
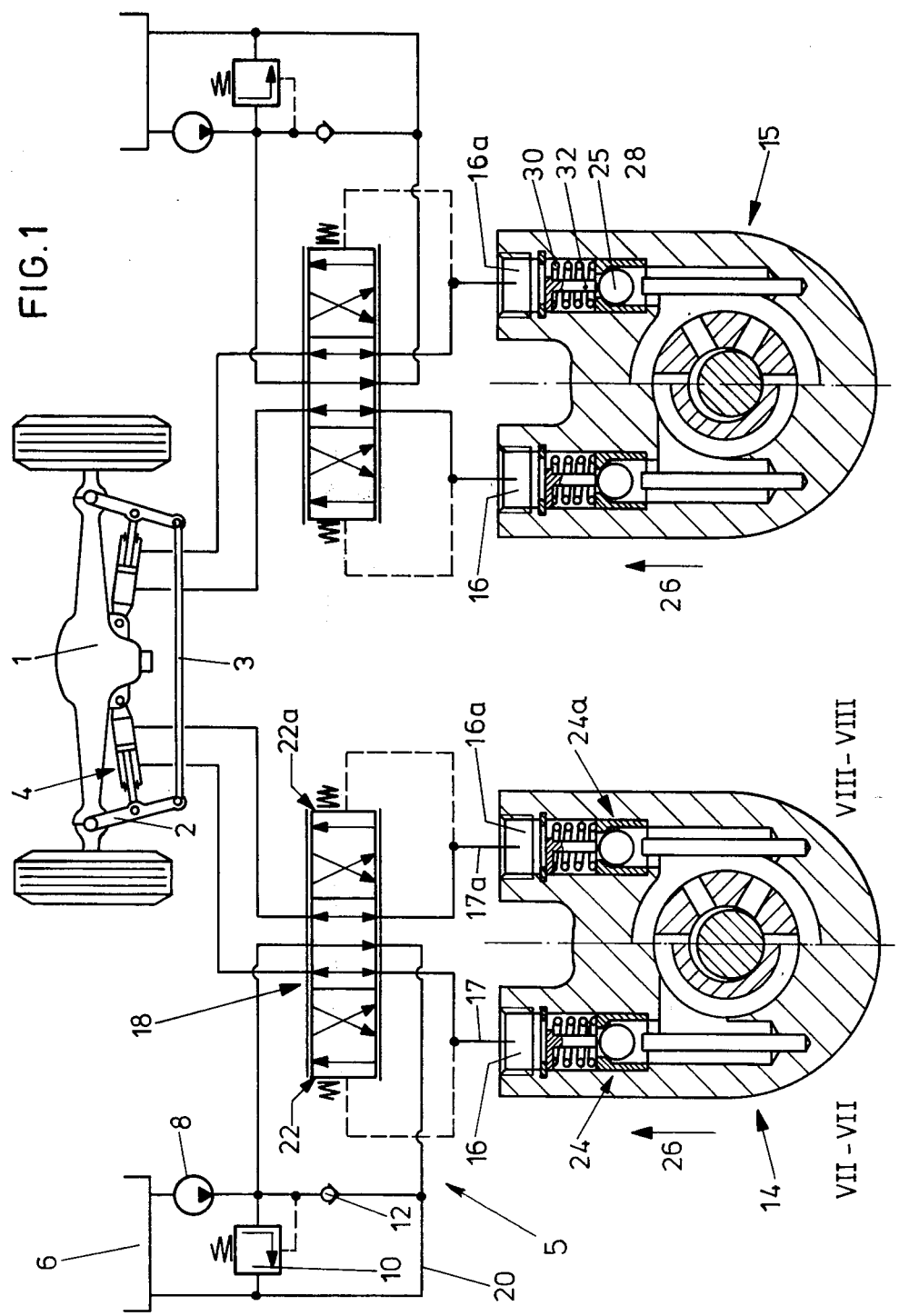
FIG. 1, is a fluid circuit diagram showing a two circuit steering system in accordance with the present invention.

Referring now to the drawings in detail, FIG. 1 shows a steering, axle 1 of a vehicle having two steering and track rod levers 2 interconnected by a tie bar 3. Two servomotors 4 pivotably anchored to the steering axle 1 are connected to and act on the steering and track rod levers 2. The servomotors are respectively associated with hydraulic circuits generally referred to by reference numeral 5. The reference numerals labeling one of the hydraulic circuits 5 associated with one of the servomotors 4 are also applicable to the other of the hydraulic circuits shown.

Each circuit 5 includes a tank 6 for the operating fluid, a high pressure source or pump 8, a safety valve 10, associated therewith, and a check valve 12. Hand operated and metering pumps are formed by positive displacement pump components generally referred to by reference numerals 14 and 15 illustrated by transverse sections taken through planes indicated by section lines VII and VIII in FIG. 3. Each of the pumps 14 and 15 have control outlets 16 and 16a. A fluid pressure operated control valve 18 is associated with each pump and in the central position thereof as shown, outlets 16 and 16a are connected to the two operating chambers of a servomotor 4 while the outlet of the high pressure pump 8 is connected to a discharge line 20 to the tank 6.

In response to operation of the pump components 14 and 15 pressurizing the control outlets 16, the control valves 18 are shifted against the return springs 22a so that pressure fluid flows from the high pressure pumps 8 to the control outlets 16a. Pressure fluid flows from the control outlets 16 to operating chambers of the servomotors in amounts metered by the pumps 14 and 15 and from the other operating chambers of the servomotors to the discharge lines 20. The pump components 14 and 15 are interconnected by a differential drive arrangement and connected to the manual operating mechanism, such as the hand steering wheel so that upon operation of the hand steering wheel, one of the pump components may lead somewhat the other with respect to its volumetric outflow.

In the event there is a break in a line of one of the circuits, the pump component 14 or 15 of the other circuit is no longer driven because of the differential drive and the check valves 24 and 24a provided at the control outlets 16 and 16a. Each of the check valves 24 and 24a includes a ball valve element 25 blocking flow in the direction of the arrows 26 as shown in FIG. 1, but opening readily in the opposite direction of flow. A valve seat body 28 is provided which is shiftable against the bias of spring 30 in the direction of arrow 26 and an opening pin 32 is fixed within the springs. Accordingly, the check valves open as soon as a pressure gradient in the direction of the arrow 26 exceeds a certain value. The compression spring 30 of the check valves and the return springs 22 and 22a of the control valves 18, are synchronized so that in case of a complete pressure drop in one circuit, the check valve 24 or 24a on the downstream side of one positive displacement pump component 14 or 15 may open in the direction of the arrow 26 only when the circulating pressure is greater than the pressure generated by the other of the positive displacement pump components sufficient to shift the control valve against one of its return springs 22 and 22a. Consequently, the control valve 18 associated with the intact circuit is positively displaced by its corresponding positive displacement pump component from the central position to an operating position.

Figure 2:
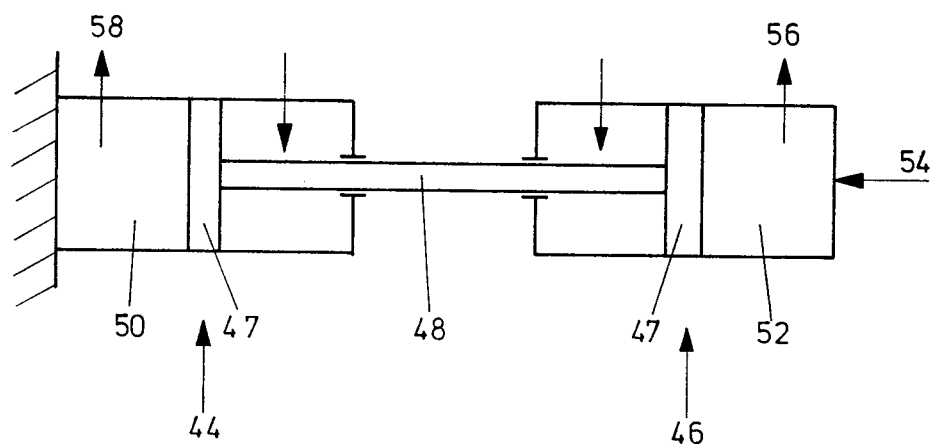
FIG. 2 is a schematic illustration of a hydraulic type of differential drive for two piston pumps.
Figure 4:
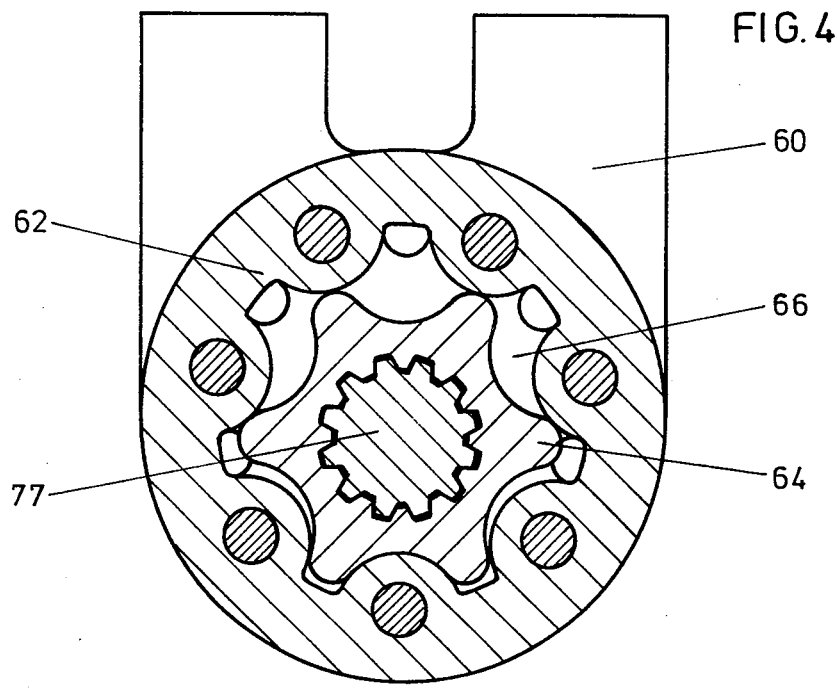
FIG. 4 is a transverse section view taken substantially through a plane indicated by section line IV—IV, FIG. 3.
Figure 5:
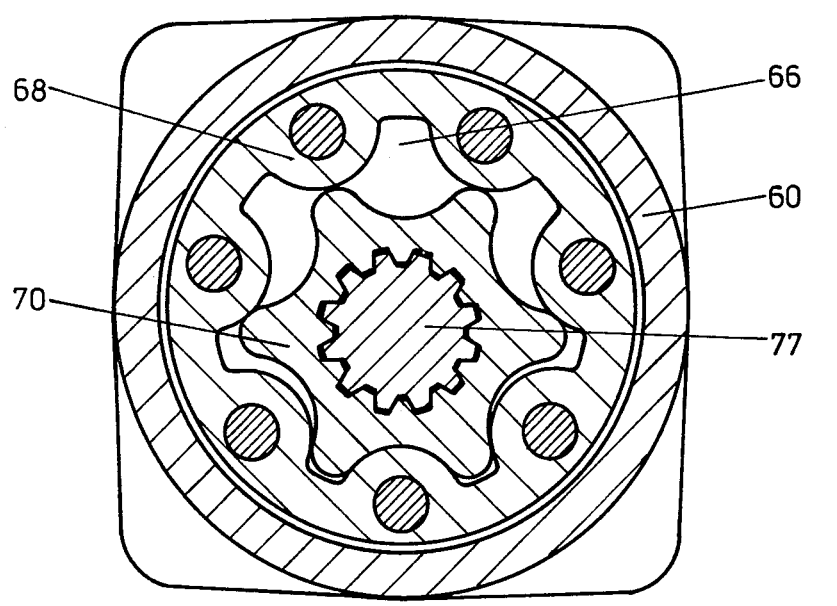
FIG. 5 is a transverse section view taken substantially through a plane indicated by section line V—V, FIG. 3.

To compensate for differences in tolerances between the positive displacement pump components and between piston surfaces of the two servomotors 4, the two pump components 14 and 15 are driven through a differential drive as aforementioned. The differential drive could be a standard mechanical equalizing gear arrangement whereby drive of the two positive displacement pump components from the steering spindle is effected at variable speeds. Constructional costs for the differential drive may be reduced considerably, however, by combining the two pump components and their differential drive arrangement into a single structural unit. The principle underlying such an arrangement will initially be explained with reference to the schematic illustration of FIG. 2. FIG. 2 shows two piston pumps 44 and 46, the pistons 47 of which are interconnected by one common piston rod 48. The cylinder 50 of the piston pump 44 is fixedly anchored. The cylinder 52 of the piston pump 46, on the other hand, may be shifted to the right or left as viewed in FIG. 2. Whenever force is exerted on the right cylinder 52, for example, by a steering wheel from the direction of the arrow 54, a pressure medium is discharged in the direction of arrow 56 to shift one of the operating servomotors. As a result of the resistance opposing discharge of the pressure medium from cylinder 52, the two pistons 47 are moved to the left and pressure medium flows out of the cylinder 50 in the direction of arrow 58 to the other operating servomotor against the latter's reactive pressure. Variable outflow quantities of the pressure medium in the direction of the arrows 56 and 58 are apparently balanced out automatically by this arrangement because of the movement of piston 47 relative to the cylinder 50. In accordance with the same principle, the rotary positive displacement pump components 14 and 15 are combined with a differential gear type drive as shown in FIGS. 3 through 5.

Figure 3:
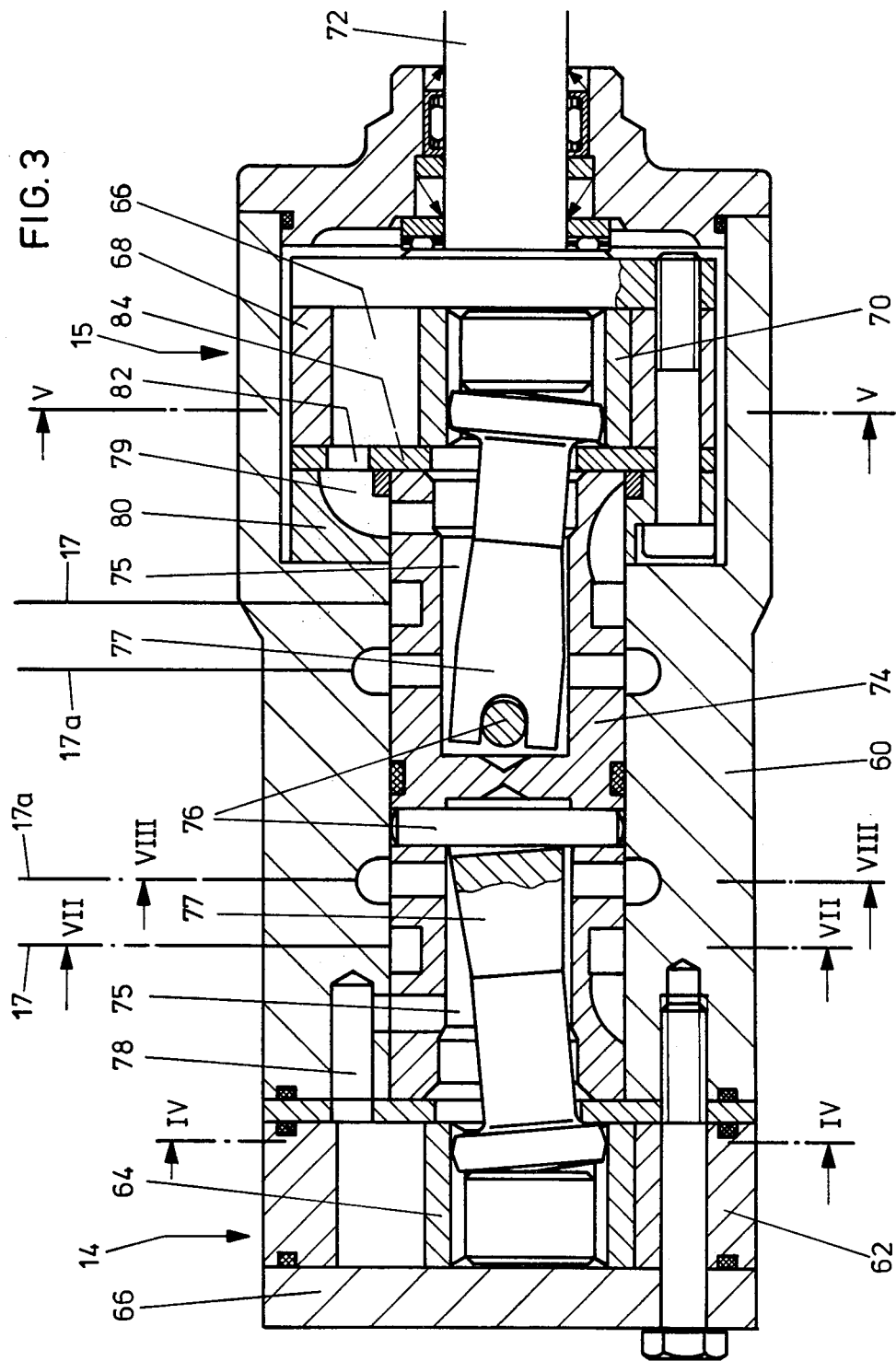
FIG. 3 is a side section view through a differential drive arrangement combined with two positive displacement pumps according to one embodiment of the invention.

As shown in FIG. 3, a housing 60 adapted to be attached to the frame of a vehicle, encloses at its left end the pump component 14 and at the right end the pump component 15. The pump component 14 has an outer gear 62 internally toothed and an inner gear 64 externally toothed with the number of teeth being less by one. Between the two gears, fluid seal pockets 66 are formed in a known manner as more clearly seen in FIG. 4. The right hand pump component 15 similarly includes an internally toothed outer gear 68 and an externally toothed inner gear 70 as more clearly seen in FIG. 5. The outer gear 68 is connected torsionally with the steering spindle 72 as shown in FIG. 3. The inner gears 64 and 70 correspond to the two pistons 47 depicted in FIG. 2, while a torque transmitting connection between the two inner gears 64 and 70 correspond to the piston rod 48 of FIG. 2. A shaft 74 having two spaced axially arranged bores 75 housing drive shafts 77 constitutes the torque transmitting connection. The drive shafts 77 are connected torsionally with the two inner gears 64 and 70 by means of cross pins 76 extending through transverse slits in the shaft 74. The drive shafts 77 may swivel sufficiently in their axial bores 75 in order to permit radial shift of the inner gears so as to execute their eccentrical movements while enmeshed with the outer gears. The shaft 74 at the same time assumes the function of the two control valves 18 depicted symbolically in FIG. 1. The right-hand portion of the shaft 74 serves as a control valve for the pump component 15 while the left-hand portion serves as a control valve for the pump component 14. Both valve portions of the shaft 74 are hydraulically separated although they are interconnected mechanically. The two control valves so formed cooperate in a manner known per se with control passages, connecting bores, annular port grooves, etc., and the housing 60, so that the pockets 66 of each pump component that are contracting volumetrically are always connected, with their control outlet 16a while the volumetrically expanding pockets are connected with their control outlet 16. The control outlets 16 and 16a depicted in FIG. 1, not labelled in FIG. 3, are in fluid communication with the control lines 17 and 17a respectively. Section views through planes VII—VII and VIII—VIII of FIG. 3 at the control outlets are shown in FIG. 1.

While overflow channels 78 from the left-hand pump 14 are provided in the housing, overflow channels 79 have been provided in a bearing ring 80 for the right-hand pump component 15. The bearing ring 80 is torsionally connected with the outer gear 68. A sealing disc 84 is provided with holes 82 between the bearing ring 80 and the outer gear 68 and is torsionally connected with both.

Whenever the steering spindle 72 is rotated so that the right-hand pump component 15 delivers pressure fluid to its control line 17 against an external pressure, the left-hand pump component 14 is driven by the two drive shafts 77 and the shaft 74 in such a directional sense that it also feeds pressure medium to its control line 17 against an external pressure. The flow circulating speed through both control outlets may be variable and equalization thereof occurs by means of the shaft connection aforementioned.

What is claimed is:

1. In a fluid steering system for a vehicle having two pressure sources (8), two servomotors (4) acting on steered parts (2) of the vehicle, hand operated and metering pumps (14 and 15) drivable by one operating mechanism (72) and pressure operated control valve means (18) equipped with return springs (22 and 22a) for connecting the servomotors with one of the pressure sources, the improvement residing in differential drive means for drivingly connecting the operating mechanism to the hand operated and metering pumps, conduits means (17 and 17a) for connecting the pumps to the control valve means, and check valve means responsive to a loss of pressure in one of the conduit means associated with one of the pumps for maintaining operation of the other of the pumps to generate sufficient pressure to operate the control valve means against the bias of the return springs.

2. In the system as defined in claim 1, wherein each of said pumps is of the positive displacement type having two control ports (16 and 16a), an internally toothed outer gear (62, 68) and an externally toothed inner gear (64, 70) in mesh with and mounted eccentrically within the outer gear to form sealed pockets (66) of varying volume during relative rotation of the gears, said control valve means including two valve control elements, a housing (60) enclosing the pumps and having valve passages cooperating with the valve elements to connect the pockets undergoing volumetric expansion with one of the control ports and the pockets undergoing contraction to the other of the control ports of the pumps, said differential drive means including drive shafts (77) interconnecting the valve elements with the inner gears for universal movement relative to each other, means connecting one of said outer gears (68) to the operating mechanism, and means fixedly anchoring the other of the outer gears (62) to the vehicle.

3. In the system as defined in claim 2, wherein both of the valve control elements are formed on a single shaft (74) having spaced axially arranged bores (75) within which the drive shafts are disposed, the inner gears of the pumps being connected torsionally and swivelly to said single shaft by the drive shafts.

4. In the system as defined in claim 1, 2, or 3, wherein said check valve means blocks flow in one direction to the servomotors but conducts flow in the opposite direction when the servomotor pressure is greater than the actuating pressure of the pumps necessary for shifting of the control valve means against the bias of the return springs.

* * * * *